US010425957B2

(12) United States Patent
Yang et al.

(10) Patent No.: US 10,425,957 B2
(45) Date of Patent: Sep. 24, 2019

(54) METHOD FOR MULTI-USER SCHEDULING IN MIMO SYSTEM, AND APPARATUS

(71) Applicant: Huawei Technologies Co., Ltd., Shenzhen (CN)

(72) Inventors: Jing Yang, Shanghai (CN); Ni Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 15/789,427

(22) Filed: Oct. 20, 2017

(65) Prior Publication Data
US 2018/0063856 A1 Mar. 1, 2018

Related U.S. Application Data

(63) Continuation of application No. PCT/CN2015/077145, filed on Apr. 22, 2015.

(51) Int. Cl.
*H04W 72/12* (2009.01)
*H04B 7/0452* (2017.01)
(Continued)

(52) U.S. Cl.
CPC .......... *H04W 72/12* (2013.01); *H04B 7/0452* (2013.01); *H04B 7/0456* (2013.01);
(Continued)

(58) Field of Classification Search
CPC ..... H04W 7/12; H04B 7/0456; H04B 7/0632; H04B 7/0639
See application file for complete search history.

(56) References Cited

U.S. PATENT DOCUMENTS 9,042,255 B2 * 5/2015 Mondal ................. H04W 24/00
370/252
2011/0319027 A1 * 12/2011 Sayana ................. H04B 7/0632
455/67.11
(Continued)

FOREIGN PATENT DOCUMENTS

CN 101630966 A 1/2010
CN 101667896 A 3/2010
(Continued)

OTHER PUBLICATIONS

Lin Xue Hong, et al., "Selection Strategy of Codebook for Precoding Based on 3GPP LTE System", Journal of Beijing University of Posts and Telecommunications, vol. 33, No. 1, Feb. 2010, with an English translation, total 9 pages.

*Primary Examiner* — Charles C Jiang
*Assistant Examiner* — Ryan C Kavleski
(74) *Attorney, Agent, or Firm* — Slater Matsil, LLP

(57) ABSTRACT

An apparatus and a method for multi-user scheduling in a MIMO system are disclosed. In an embodiment the method includes, receiving, by a base station, PMIs and CQIs of first codewords and second codewords, where the PMIs and the CQIs are fed back by N UEs; grouping UEs whose PMIs are the same into one pairing group to divide the N UEs into M pairing groups; and determining a user pairing combination of each pairing group according to a CQI of a first codeword of each UE in the pairing group and a CQI of a second codeword of each UE in the pairing group. The method further includes determining an optimal user pairing combination from M user pairing combinations. The base station schedules two UEs in the optimal user pairing combination simultaneously.

15 Claims, 6 Drawing Sheets

(51) Int. Cl.
*H04B 7/0456* (2017.01)
*H04B 7/06* (2006.01)
(52) U.S. Cl.
CPC ......... *H04B 7/0482* (2013.01); *H04B 7/0632* (2013.01); *H04B 7/0639* (2013.01); *H04B 7/063* (2013.01)

(56) References Cited

U.S. PATENT DOCUMENTS

| | | | | |
|---|---|---|---|---|
| 2012/0189082 | A1* | 7/2012 | Zhang | H04B 7/0452 |
| | | | | 375/299 |
| 2012/0213169 | A1* | 8/2012 | Wang | H04B 7/04 |
| | | | | 370/329 |
| 2014/0169287 | A1* | 6/2014 | Chen | H04L 25/03343 |
| | | | | 370/329 |
| 2014/0269395 | A1* | 9/2014 | Chen | H04B 7/024 |
| | | | | 370/252 |

FOREIGN PATENT DOCUMENTS

| | | |
|---|---|---|
| CN | 101997655 A | 3/2011 |
| CN | 102316597 A | 1/2012 |
| CN | 102377534 A | 3/2012 |
| CN | 102420645 A | 4/2012 |
| CN | 102571301 A | 7/2012 |
| CN | 103580741 A | 2/2014 |
| WO | 2009026769 A1 | 3/2009 |

* cited by examiner

METHOD FOR MULTI-USER SCHEDULING IN MIMO SYSTEM, AND APPARATUS

CROSS-REFERENCE TO RELATED APPLICATIONS

This application is a continuation of International Application No. PCT/CN2015/077145, filed on Apr. 22, 2015, the disclosure of which is hereby incorporated by reference in its entirety.

TECHNICAL FIELD

Embodiments of the present invention relate to data communications technologies, and in particular, to a method for multi-user scheduling in a multiple-input multiple-output (MIMO) system, and an apparatus.

BACKGROUND

According to a MIMO technology, a multiple-antenna technology is used in a base station and user equipment to suppress channel fading, to significantly increase channel capacity, network coverage, and spectrum utilization. The MIMO technology includes a multi-user multiple-input multiple-output (MU-MIMO) technology and a single user multiple-input multiple-output (SU-MIMO) technology.

According to the MU-MIMO technology, a user equipment (UE) generally feeds back downlink channel information measured by the user equipment to a base station; then, the base station selects, according to a scheduling policy of the base station, appropriate terminals from terminals that need to be served, and performs pairing. Downlink information of successfully paired user equipments can be mapped to different spatial information flows by means of MIMO spatial multiplexing and transmitted on a same communication resource. In a MU-MIMO scenario, the base station uses codebook-based orthogonal pairing. A probability of successful codebook-based orthogonal pairing is very low. If codebook-based orthogonal pairing fails, the base station can schedule only one UE at one time, leading to a waste of radio resources.

SUMMARY

Embodiments of the present invention provide a method for multi-user scheduling in a MIMO system, and an apparatus, to increase a probability of successful user pairing and therefore improve radio resource utilization.

A first aspect of embodiments of the present invention provides a method for multi-user scheduling in a MIMO system, including receiving, by a base station, precoding matrix indicators PMIs, and channel quality indicators CQIs of first codewords and second codewords, where the PMIs and the CQIs are fed back by N user equipments UEs, and N is a positive integer greater than or equal to 1 and dividing, by the base station, the N UEs into M pairing groups according to the PMIs fed back by the N UEs, where PMIs of all UEs in each pairing group are the same, and M is a positive integer greater than or equal to 1. The method further includes, for each pairing group, computing, by the base station, a scheduling priority of a first codeword of each UE in the pairing group according to CQIs of first codewords of all UEs in the pairing group, and computing a scheduling priority of a second codeword of each UE in the pairing group according to CQIs of second codewords of all the UEs in the pairing group; determining, by the base station, a user pairing combination of the pairing group according to scheduling priorities of the first codewords of all the UEs in the pairing group and scheduling priorities of the second codewords of all the UEs in the pairing group, where the user pairing combination includes two UEs; determining, by the base station, an optimal user pairing combination according to scheduling priorities of first codewords of UEs in M user pairing combinations of the M pairing groups and scheduling priorities of second codewords of the UEs in the M user pairing combinations of the M pairing groups, where two UEs in the optimal user pairing combination are different; and scheduling, by the base station, the two UEs in the optimal user pairing combination simultaneously.

With reference to the first aspect, in a first possible implementation manner of the first aspect, the determining, by the base station, a user pairing combination of the pairing group according to scheduling priorities of the first codewords of all the UEs in the pairing group and scheduling priorities of the second codewords of all the UEs in the pairing group includes comparing, by the base station, the scheduling priorities of the first codewords of all the UEs in the pairing group and the scheduling priorities of the second codewords of all the UEs in the pairing group, and determining a UE whose first codeword has the highest scheduling priority in the pairing group and a UE whose second codeword has the highest scheduling priority in the pairing group, where the UE whose first codeword has the highest scheduling priority is a first to-be-paired UE and the UE whose second codeword has the highest scheduling priority is a second to-be-paired UE; and using, by the base station, the first to-be-paired UE and the second to-be-paired UE as the user pairing combination of the pairing group.

With reference to the first possible implementation manner of the first aspect, in a second possible implementation manner of the first aspect, the determining, by the base station, an optimal user pairing combination according to scheduling priorities of first codewords of UEs in M user pairing combinations of the M pairing groups and scheduling priorities of second codewords of the UEs in the M user pairing combinations of the M pairing groups includes, for each user pairing combination, obtaining, by the base station, a scheduling priority of the user pairing combination by adding a scheduling priority of a first codeword of the first to-be-paired UE in the user pairing combination and a scheduling priority of a second codeword of the second to-be-paired UE in the user pairing combination; and comparing, by the base station, scheduling priorities of the M user pairing combinations, and selecting, from the M user pairing combinations, a user pairing combination whose scheduling priority is the highest as the optimal user pairing combination. With reference to any one of the first aspect, or the first or the second possible implementation manner of the first aspect, in a third possible implementation manner of the first aspect, before the receiving, by a base station, PMIs, and CQIs of first codewords and second codewords, where the PMIs and the CQIs are fed back by N UEs, the method further includes determining, by the base station, at least one usable codebook for the N UEs in a codebook set, and sending a PMI of the at least one usable codebook to the N UEs, so that when feeding back the PMIs to the base station, the N UEs select the PMIs to be fed back to the base station from the PMI of the at least one usable codebook; determining, by the base station, a virtual antenna mapping matrix according to the at least one usable codebook and a preset equivalent codebook; and precoding, by the base station, a common pilot signal or a channel state information-reference signal by using the virtual antenna mapping matrix, and sending the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords; and the scheduling, by the base station, the UEs in the optimal user pairing combination simultaneously includes when scheduling the UEs in the optimal user pairing combination simultaneously, precoding, by the base station by using the equivalent codebook, data to be sent to the UEs in the optimal user pairing combination.

With reference to any one of the first aspect, or the first to the third possible implementation manners of the first aspect, in a fourth possible implementation manner of the first aspect, after the determining, by the base station, an optimal user pairing combination according to scheduling priorities of first codewords of UEs in M user pairing combinations of the M pairing groups and scheduling priorities of second codewords of the UEs in the M user pairing combinations of the M pairing groups, the method further includes sending, by the base station, scheduling control information to each UE in the optimal user pairing combination, where the scheduling control information for each UE includes a scheduling mode and a modulation and coding scheme, the scheduling mode for each UE is dual-stream scheduling, and the modulation and coding scheme for each UE includes a modulation and coding scheme for a first codeword and a modulation and coding scheme for a second codeword.

A second aspect of the embodiments of the present invention provides a base station, including a receiving module, configured to receive precoding matrix indicators PMIs, and channel quality indicators CQIs of first codewords and second codewords, where the PMIs and the CQIs are fed back by N user equipments UEs, and N is a positive integer greater than or equal to 1 and a grouping module, configured to divide the N UEs into M pairing groups according to the PMIs fed back by the N UEs, where PMIs of all UEs in each pairing group are the same, and M is a positive integer greater than or equal to 1. The method further includes a pairing module, configured to: for each pairing group, compute a scheduling priority of a first codeword of each UE in the pairing group according to CQIs of first codewords of all UEs in the pairing group, and compute a scheduling priority of a second codeword of each UE in the pairing group according to CQIs of second codewords of all the UEs in the pairing group; where the pairing module is further configured to determine a user pairing combination of the pairing group according to scheduling priorities of the first codewords of all the UEs in the pairing group and scheduling priorities of the second codewords of all the UEs in the pairing group, where the user pairing combination includes two UEs; and the pairing module is further configured to determine an optimal user pairing combination according to scheduling priorities of first codewords of UEs in M user pairing combinations of the M pairing groups and scheduling priorities of second codewords of the UEs in the M user pairing combinations of the M pairing groups, where two UEs in the optimal user pairing combination are different; and a scheduling module, configured to schedule the two UEs in the optimal user pairing combination simultaneously.

With reference to the second aspect, in a first possible implementation manner of the second aspect, the determining, by the pairing module, a user pairing combination of the pairing group according to scheduling priorities of the first codewords of all the UEs in the pairing group and scheduling priorities of the second codewords of all the UEs in the pairing group is specifically comparing the scheduling priorities of the first codewords of all the UEs in the pairing group and the scheduling priorities of the second codewords of all the UEs in the pairing group, and determining a UE whose first codeword has the highest scheduling priority in the pairing group and a UE whose second codeword has the highest scheduling priority in the pairing group, where the UE whose first codeword has the highest scheduling priority is a first to-be-paired UE and the UE whose second codeword has the highest scheduling priority is a second to-be-paired UE; and using the first to-be-paired UE and the second to-be-paired UE as the user pairing combination of the pairing group.

With reference to the first possible implementation manner of the second aspect, in a second possible implementation manner of the second aspect, the determining, by the pairing module, an optimal user pairing combination according to scheduling priorities of first codewords of UEs in M user pairing combinations of the M pairing groups and scheduling priorities of second codewords of the UEs in the M user pairing combinations of the M pairing groups is specifically for each user pairing combination, obtaining a scheduling priority of the user pairing combination by adding a scheduling priority of a first codeword of the first to-be-paired UE in the user pairing combination and a scheduling priority of a second codeword of the second to-be-paired UE in the user pairing combination; and comparing scheduling priorities of the M user pairing combinations, and selecting, from the M user pairing combinations, a user pairing combination whose scheduling priority is the highest as the optimal user pairing combination.

With reference to any one of the second aspect, or the first or the second possible implementation manner of the second aspect, in a third possible implementation manner of the second aspect, the base station further includes a determining module, configured to determine at least one usable codebook for the N UEs in a codebook set, and send a PMI of the at least one usable codebook to the N UEs, so that when feeding back the PMIs to the base station, the N UEs select the PMIs to be fed back to the base station from the PMI of the at least one usable codebook; and a virtual mapping module, configured to determine a virtual antenna mapping matrix according to the at least one usable codebook and a preset equivalent codebook; where the virtual mapping module is further configured to precode a common pilot signal or a channel state information-reference signal by using the virtual antenna mapping matrix, and send the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords; and the scheduling module is specifically configured to: when scheduling the UEs in the optimal user pairing combination simultaneously, precode, by using the equivalent codebook, data to be sent to the UEs in the optimal user pairing combination.

With reference to any one of the second aspect, or the first to the third possible implementation manners of the second aspect, in a fourth possible implementation manner of the second aspect, the base station further includes a sending module, configured to send scheduling control information to each UE in the optimal user pairing combination, where the scheduling control information for each UE includes a scheduling mode and a modulation and coding scheme, the scheduling mode for each UE is dual-stream scheduling, and the modulation and coding scheme for each UE includes a modulation and coding scheme for a first codeword and a modulation and coding scheme for a second codeword.

A third aspect of the embodiments of the present invention provides a base station, including a processor, a memory, a communications interface, and a system bus, where the memory and the communications interface connect to and communicate with the processor by using the system bus; the memory is configured to store a computer-executable instruction; and the processor is configured to run the computer-executable instruction to execute any one of the methods provided according to the first aspect of the embodiments of the present invention and the first to the fourth possible implementation manners of the first aspect.

According to the method for multi-user scheduling in a MIMO system, and the apparatus provided in the embodiments of the present invention, a base station receives PMIs and CQIs that are fed back by N UEs for dual-stream scheduling, and groups UEs whose PMIs are the same into one pairing group according to the PMIs fed back by the N UEs; then, the base station computes scheduling priorities of first codewords of UEs in each pairing group and scheduling priorities of second codewords of the UEs in each pairing group according to CQIs of the UEs in each pairing group, determines a user pairing combination of each pairing group according to the scheduling priorities of first codewords of UEs in each pairing group and the scheduling priorities of second codewords of UEs in each pairing group, compares scheduling priorities of first codewords of UEs in a user pairing combination of at least one pairing group and scheduling priorities of second codewords of the UEs in the user pairing combination of the at least one pairing group, and determines an optimal user pairing combination. In the method, UEs whose PMIs are the same are grouped into one pairing group, to increase a probability of successful UE pairing in each pairing group. The base station can schedule two UEs simultaneously, and radio resource utilization is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the embodiments of the present invention.

In the prior art, in a MU-MIMO scenario, a base station uses codebook-based orthogonal pairing. A probability of successful codebook-based orthogonal pairing is very low. If codebook-based orthogonal pairing fails, the base station can schedule only one UE at one time, leading to a waste of radio resources. In addition, in the MU-MIMO scenario, a UE performs CQI measurement and feedback in a SU-MIMO manner, that is, the UE feeds back a CQI for single-user scheduling. In multi-user scheduling, there is interference between users, and a CQI fed back by a UE in single-user scheduling cannot reflect channel quality accurately. As a result, a codebook selected by the base station is inappropriate. The inappropriate codebook selected by the base station further increases the interference between the multiple users and degrades overall system performance.

To resolve the problem in the prior art, the embodiments of the present invention provide a method for multi-user scheduling in a MIMO system. The method in the embodiments of the present invention is applied to a MU-MIMO scenario, and a base station supports dual-stream scheduling, for example, two codewords may be used. A Long Term Evolution (LTE) system is used as an example. There are seven transmission modes (TM) in the LTE system. Among the seven transmission modes, TM5 and TM9 modes are applied to the MU-MIMO scenario, and a $TM_4$ mode is applied to a SU-MIMO scenario. In the prior art, the $TM_5$ mode is for single-stream scheduling. $TM_5$ may be modified, or $TM_4$ and $TM_9$ may be modified, to apply the method in the embodiments. In the following embodiments, the $TM_4$ mode is used as an example for description. A main mode of $TM_4$ is closed-loop spatial multiplexing, used for a low-speed scenario in which a UE needs to report a rank indication (RI), a CQI, and a PMI. $TM_5$ is MU-MIMO, and a main idea is to allow two users to use a common channel resource when channels of the two users are "orthogonal", to increase a cell throughput. The $TM_9$ mode is a mode newly added to LTE-A and can support transmission of a maximum of eight layers, mainly to improve a data transmission rate.

Figure 1:
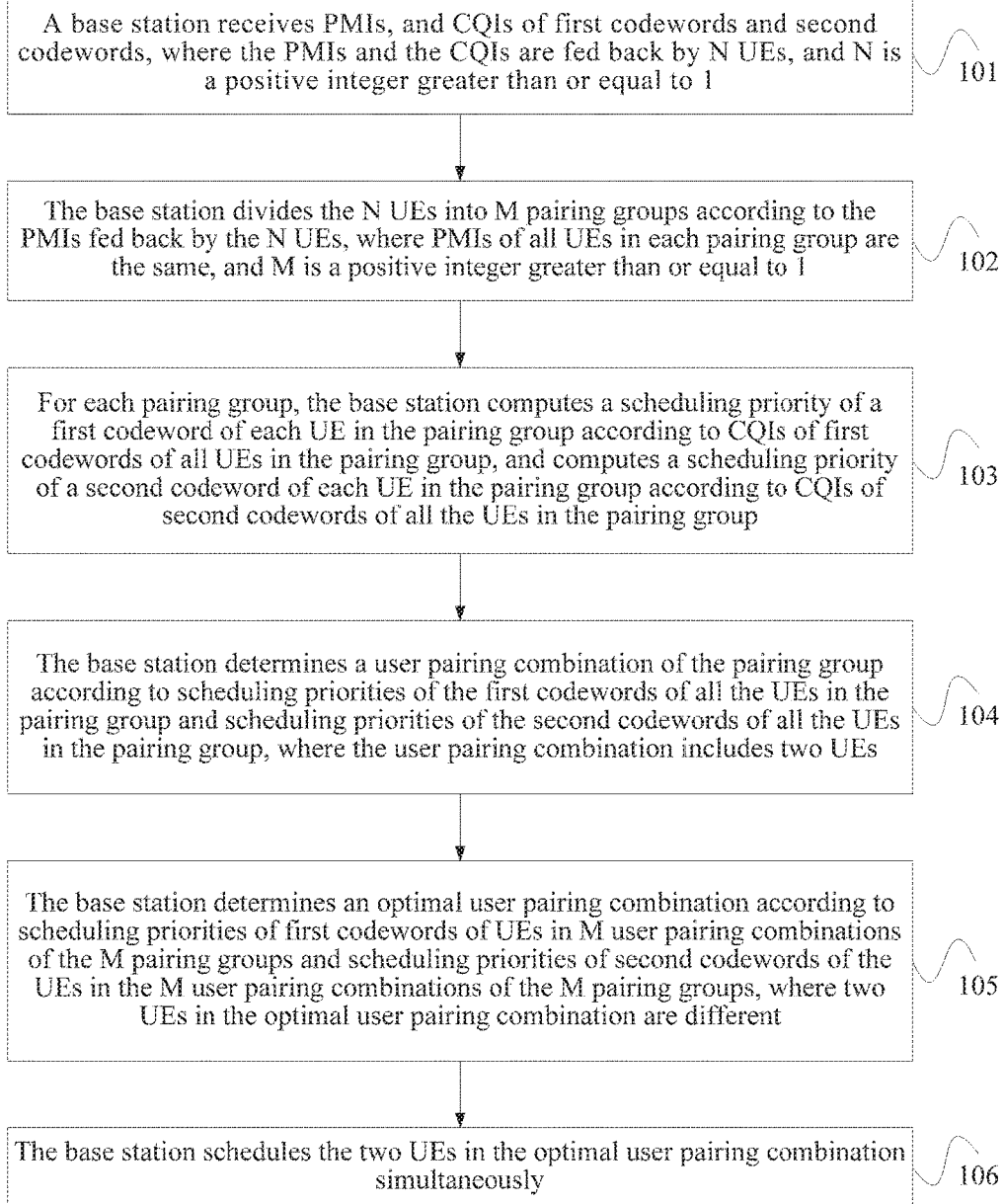
FIG. 1 is a flowchart of a method for multi-user scheduling in a MIMO system according to a first embodiment of the present invention.

FIG. 1 is a flowchart of a method for multi-user scheduling in a MIMO system according to a first embodiment of the present invention. As shown in FIG. 1, the method provided in this embodiment may include the following steps.

Step 101: A base station receives precoding matrix indicators (PMI), and channel quality indicators (CQI) of first codewords and second codewords, where the PMIs and the CQIs are fed back by N UEs, and N is a positive integer greater than or equal to 1.

The $TM_4$ mode is used as an example. The base station needs to set a transmission mode of the N UEs to the $TM_4$ mode before performing this step. In $TM_4$ mode, the base station schedules the N UEs by means of dual-stream scheduling. In a specific implementation, the base station may determine whether to set the transmission mode of the UEs to the $TM_4$ mode according to whether a quantized feedback value of an air-interface signal to interference plus noise ratio (SINR) fed back by the UEs meets a preset first threshold. The quantized feedback value of the SINR is the CQI. Alternatively, the base station determines whether to set the transmission mode of the UEs to the $TM_4$ mode by determining whether a quantity of the UEs meets a preset second threshold at a current moment. This is only an example for description. Alternatively, the base station may determine in another manner whether to set the transmission mode of the UEs to the $TM_4$ mode. This is not limited in this embodiment.

In dual-stream scheduling, two codewords may be used for scheduling of each UE. A codeword is an independently coded data block and corresponds to, at a transmit end, an independent transport block (TB) that is sent from a Media Access Control (MAC) layer to a physical layer. In LTE, only two codewords are used. The base station can receive or send a maximum of only two TBs on one space-time resource within one transmission time interval (TTI).

After the base station sets the transmission mode of the UEs to the $TM_4$ mode, the UEs perform channel measurement in $TM_4$ mode, obtain the PMIs, and the CQIs of the first codewords and the second codewords according to a channel measurement result, and feedback the PMIs, and the CQIs of the first codewords and the second codewords obtained by means of measurement to the base station. The PMI is an index of a codebook, and each codebook uniquely corresponds to one PMI. In an LTE system, precoding is performed based on a selected codebook. Precoding performed based on a selected codebook means that a known codebook set is shared by a transmit end and a receive end, where the codebook set includes multiple precoding matrices, and a precoding matrix is a codebook. According to a channel measurement result, the receive end selects, based on a performance target, a codebook that ensures optimal performance from the codebook set, and feeds back an index (that is, a PMI) of the codebook to the transmit end. The transmit end finds, according to the PMI fed back by the receive end, the codebook corresponding to the PMI from the codebook set, and performs precoding by using the codebook.

Step 102: The base station divides the N UEs into M pairing groups according to the PMIs fed back by the N UEs, where PMIs of all UEs in each pairing group are the same, and M is a positive integer greater than or equal to 1.

After receiving the PMIs sent by the N UEs, the base station groups the N UEs according to the PMIs. UEs whose PMIs are the same are grouped into one pairing group. For example, there are a total of 10 UEs, and PMIs returned by the 10 UEs include two PMIs: PMI 0 and PMI 1. In this case, the 10 UEs are divided into two pairing groups: a pairing group 1 and a pairing group 2. All UEs whose PMI values are PMI 0 are grouped into the pairing group 1, and all UEs whose PMI values are PMI 1 are grouped into the pairing group 2. Assuming that a total of four UEs feedback PMIs whose values are PMI 0 and the other six UEs feedback PMIs whose values are PMI 1, the pairing group 1 includes a total of four UEs, and the pairing group 2 includes a total of six UEs. This is only an example for description. There may be more or fewer PMI values. For example, if values of all the PMIs returned by the 10 UEs are PMI 0 or PMI 1, the base station groups the 10 UEs into one pairing group.

Step 103: For each pairing group, the base station computes a scheduling priority of a first codeword of each UE in the pairing group according to CQIs of first codewords of all UEs in the pairing group, and computes a scheduling priority of a second codeword of each UE in the pairing group according to CQIs of second codewords of all the UEs in the pairing group.

In a communications service, spectrum resources and power resources are both limited. However, in a cell, quantities of users and traffic volumes are different. A system cannot consider only some of the users, and therefore needs to appropriately allocate the spectrum resources and the power resources, to ensure normal good communication for the users in the system. Such an allocation method or policy is a scheduling algorithm. Scheduling priorities of all UEs in the cell are computed by using the scheduling algorithm. In dual-stream scheduling, the base station needs to compute a scheduling priority of a first codeword of each UE in the cell and a scheduling priority of a second codeword of each UE in the cell, and a UE with a higher scheduling priority is preferentially scheduled by the base station.

In $TM_4$ mode, a UE has a total of two codewords: a codeword 0 and a codeword 1. When a first codeword is the codeword 0, a second codeword is the codeword 1; when a first codeword is the codeword 1, a second codeword is the codeword 0. For each pairing group, the base station computes a scheduling priority of a first codeword of each UE in the pairing group and a scheduling priority of a second codeword of each UE in the pairing group. For computation of scheduling priorities, the scheduling priority of a first codeword of each UE and the scheduling priority of a second codeword of each UE may be computed by using a proportional fair scheduling (PF) method that is commonly used in the industry. Alternatively, the base station may use other existing methods to compute the scheduling priority of a first codeword of each UE and the scheduling priority of a second codeword of each UE. These other methods are not listed herein one by one.

Step 104: The base station determines a user pairing combination of the pairing group according to scheduling priorities of the first codewords of all the UEs in the pairing group and scheduling priorities of the second codewords of all the UEs in the pairing group, where the user pairing combination includes two UEs.

Specifically, the base station first compares the scheduling priorities of the first codewords of all the UEs in the pairing group and the scheduling priorities of the second codewords of all the UEs in the pairing group, and determines a UE whose first codeword has the highest scheduling priority in the pairing group and a UE whose second codeword has the highest scheduling priority in the pairing group, where the UE whose first codeword has the highest scheduling priority is a first to-be-paired UE and the UE whose second codeword has the highest scheduling priority is a second to-be-paired UE. Then, the base station uses the first to-be-paired UE and the second to-be-paired UE as the user pairing combination of the pairing group.

In a specific implementation, for each pairing group, the base station may obtain a scheduling priority queue of the first codewords of all the UEs in the pairing group by sorting the scheduling priorities of the first codewords, and obtain a scheduling priority queue of the second codewords of all the UEs in the pairing group by sorting the scheduling priorities of the second codewords, to obtain the UE whose first codeword has the highest scheduling priority in the pairing group and the UE whose second codeword has the highest scheduling priority in the pairing group.

For each pairing group, the first to-be-paired UE and the second to-be-paired UE may be one UE or may be different UEs.

Step 105: The base station determines an optimal user pairing combination according to scheduling priorities of first codewords of UEs in M user pairing combinations of the M pairing groups and scheduling priorities of second codewords of the UEs in the M user pairing combinations of the M pairing groups, where two UEs in the optimal user pairing combination are different.

Specifically, for each user pairing combination, the base station first adds a scheduling priority of a first codeword of the first to-be-paired UE in the user pairing combination and a scheduling priority of a second codeword of the second to-be-paired UE in the user pairing combination, to obtain a scheduling priority of the user pairing combination of the pairing group. For example, there are a total of two user pairing combinations: a user pairing combination 1 and a user pairing combination 2. The user pairing combination 1 includes UE 1 and UE 2, and the user pairing combination 2 includes UE 3 and UE 4. It is assumed that the UE 1 is a first to-be-paired UE and the UE 2 is a second to-be-paired UE. Then, a codeword 0 of the UE 1 participates in pairing, and a scheduling priority of the codeword 0 is 5; a codeword 1 of the UE 2 participates in pairing, and a scheduling priority of the codeword 1 is 10. In this case, a scheduling priority of the user pairing combination 1 is 15. Similarly, a scheduling priority of the user pairing combination 2 can be obtained.

In an implementation manner, the base station compares scheduling priorities of the M user pairing combinations of the M pairing groups, and selects a user pairing combination whose scheduling priority is the highest from the M user pairing combinations; then, the base station determines whether two UEs in the user pairing combination whose scheduling priority is the highest are the same, and uses the user pairing combination whose scheduling priority is the highest as the optimal user pairing combination if the two UEs in the user pairing combination whose scheduling priority is the highest are different. In the foregoing example, it is assumed that the scheduling priority of the user pairing combination 1 is 15 and the scheduling priority of the user pairing combination 2 is 18. In this case, the base station determines the user pairing combination 2 as the optimal user pairing combination. If the two UEs included in the user pairing combination whose scheduling priority is the highest in the M pairing combinations are the same, the base station further determines whether two UEs in a user pairing combination whose scheduling priority is lower are the same. If the two UEs in the user pairing combination whose scheduling priority is lower are different, the base station uses the user pairing combination whose scheduling priority is lower as the optimal user pairing combination. If the two UEs in the user pairing combination whose scheduling priority is lower are the same, the base station continues to determine whether a user pairing combination whose scheduling priority is even lower meets the condition, until the optimal user pairing combination is found. When two UEs included in each of the M user pairing combinations are the same, the pairing fails, and there is no optimal user pairing combination.

In another implementation manner, the base station separately determines whether two UEs in each of the M user pairing combinations of the M pairing groups are the same, and determines usable user pairing combinations from the M user pairing combinations, where the usable user pairing combination is a user pairing combination with two different UEs. Then, the base station compares scheduling priorities of the usable user pairing combinations, and selects, from the usable user pairing combinations, a user pairing combination whose scheduling priority is the highest as the optimal user pairing combination.

It should be noted that, when there is only one pairing group, if two UEs included in a user pairing combination of the pairing group are different, the base station directly uses the user pairing combination of the pairing group as the optimal user pairing combination. If two UEs included in a user pairing combination of the pairing group are the same, the pairing fails.

Optionally, after determining the optimal user pairing combination, the base station sends scheduling control information to each UE in the optimal user pairing combination. The scheduling control information for each UE includes a scheduling mode and a modulation and coding scheme (MCS). The scheduling mode for each UE is dual-stream scheduling. The MCS for each UE includes an MCS for a first codeword and an MCS for a second codeword. For example, in a pairing group 2, a first codeword of $UE_3$ participates in pairing, a second codeword of $UE_4$ participates in pairing, an MCS for the first codeword of the $UE_3$ is MCSx, and an MCS for the second codeword of the $UE_4$ is MCSy. In this case, a scheduling mode included in scheduling control information for the $UE_3$ is dual-stream scheduling, where an MCS for a first codeword is MCSx, and an MCS for a second codeword is MCSy. Scheduling control information for the $UE_4$ is the same as the scheduling control information for the $UE_3$.

After a UE receives scheduling control information, if it is determined that a scheduling mode for the UE is dual-stream scheduling, the UE can demodulate a received signal by using a demodulation method corresponding to dual-stream scheduling, to suppress interference in dual-stream scheduling. For example, the UE may use a maximum likelihood detection (MLD) receiver. The MLD receiver computes, by means of traversal, log-likelihood information of two bitstreams in all constellation combinations by using MCS information for two codewords that are used in dual-stream scheduling, and selects a constellation whose likelihood information is the greatest as a final demodulation result.

Step 106: The base station schedules the two UEs in the optimal user pairing combination simultaneously.

After the optimal user pairing combination is determined, the base station schedules the two UEs in the optimal user pairing combination simultaneously according to a pairing result, to perform transmission processing on a physical downlink shared channel (PDSCH).

The method in this embodiment is applicable to a MIMO system. This embodiment does not limit a quantity of antennas of the base station or a specific form of the antenna. The base station may use two transmit antennas, four transmit antennas, or more transmit antennas. The antenna may be in a form of conventional co-coverage dual-polarized antennas, a dual-beam antenna, an adaptive antenna system (AAS), two logical antennas or four logical antennas formed by means of digital beamforming, or the like.

In this embodiment, a base station receives PMIs of first codewords and second codewords, and CQIs of first codewords and second codewords, where the PMIs and the CQIs are fed back by N UEs, and divides the N UEs into M pairing groups according to the PMIs fed back by the N UEs, where PMIs of all UEs in each pairing group are the same; then, for each pairing group, the base station computes a scheduling priority of a first codeword of each UE in the pairing group and a scheduling priority of a second codeword of each UE in the pairing group according to a CQI of the first codeword of each UE in the pairing group and a CQI of the second codeword of each UE in the pairing group, determines a user pairing combination of the pairing group according to scheduling priorities of first codewords of all UEs in the pairing group and scheduling priorities of second codewords of all the UEs in the pairing group, and determines an optimal user pairing combination according to scheduling priorities of first codewords of UEs in M user pairing combinations of the M pairing groups and scheduling priorities of second codewords of the UEs in the M user pairing combinations of the M pairing groups; in subsequent scheduling, the base station schedules two UEs in the optimal user pairing combination simultaneously. In the method, the base station groups UEs whose PMIs are the same into one pairing group, to increase a probability of successful UE pairing in each pairing group. An increased probability of successful UE pairing improves utilization of radio resources.

In addition, in the solution in this embodiment, the CQIs and PMIs measured by the UEs are CQIs and PMIs in multi-user scheduling and can reflect channel quality accurately. This makes a codebook selected by the base station more appropriate and reduces interference between multiple users.

Figure 2:
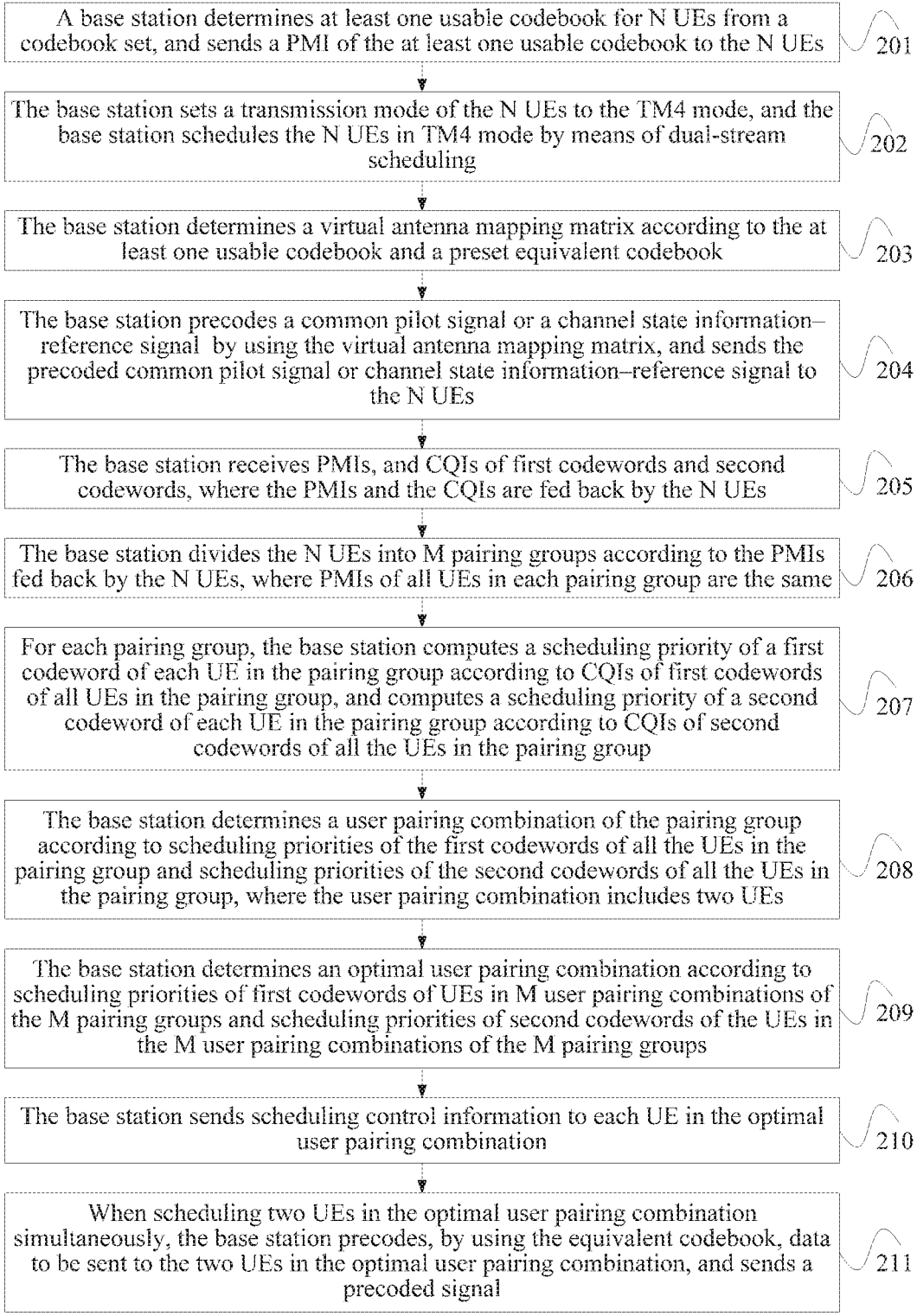
FIG. 2 is a flowchart of a method for multi-user scheduling in a MIMO system according to a second embodiment of the present invention.

FIG. 2 is a flowchart of a method for multi-user scheduling in a MIMO system according to a second embodiment of the present invention. A difference between the first embodiment and the second embodiment is that, in the second embodiment, a quantity of usable codebooks for UEs is further limited to further increase a probability of successful user pairing. As shown in FIG. 2, the method in this embodiment may include the following steps.

Step 201: The base station determines at least one usable codebook for N UEs in a codebook set, and sends a PMI of the at least one usable codebook to the N UEs.

When the base station uses two transmit antennas, if a rank used for dual-stream scheduling is 2, the codebook set includes two codebooks in rank 2. When the base station uses four transmit antennas, the codebook set includes 16 codebooks. For 16 codebooks, there are 16 PMIs. If a quantity of codebooks is not limited, UEs return a relatively large quantity of PMIs in a system. When there is a relatively small quantity of UEs, if each UE feeds back a different PMI, each pairing group may include only one UE, resulting in a very high probability of pairing failure. For example, the system includes a total of six UEs. Because there is a relatively large quantity of codebooks in a codebook set, each UE selects a different codebook during independent codebook selection. As a result, each UE returns a different PMI; when a base station performs grouping according to PMIs, each pairing group includes only one UE. In this case, user pairing fails.

In order to increase a probability of successful user pairing, in this embodiment, the base station determines the at least one usable codebook for the N UEs in the codebook set, and sends the a PMI of the at least one usable codebook to the N UEs, so that when feeding back the PMIs to the base station, the N UEs select the PMIs to be fed back to the base station from the PMI of the at least one usable codebook. A quantity of the usable codebooks determined by the base station is as small as possible. For example, generally, the quantity of the usable codebooks may be limited to 1 or 2. The base station may send the quantity of the usable codebooks and the PMIs of the usable codebooks to the N UEs by means of higher layer signaling. When the quantity of the usable codebooks is 2, a PMI fed back by each UE may have only two values. In this case, even if there is a relatively small quantity of UEs, there is a relatively large quantity of UEs in each pairing group, and a probability of successful user pairing is very high.

Step 202: The base station sets a transmission mode of the N UEs to a $TM_4$ mode, and the base station schedules the N UEs in $TM_4$ mode by means of dual-stream scheduling.

Step 203: The base station determines a virtual antenna mapping (VAM) matrix according to the at least one usable codebook and a preset equivalent codebook.

When the base station uses four antennas, the virtual antenna mapping matrix may be specifically generated in the following manner. It is assumed that there are a total of two usable codebooks $W_0$ and $W_1$ in the case of four antennas, and $W_0$ and $W_1$ are orthogonal. It is assumed that the system needs to generate equivalent codebooks in the following forms:

$$\frac{1}{2}\begin{bmatrix} 1 & 0 \\ 1 & 0 \\ 0 & 1 \\ 0 & 1 \end{bmatrix} \text{ and } \frac{1}{2}\begin{bmatrix} 1 & 0 \\ j & 0 \\ 0 & 1 \\ 0 & j \end{bmatrix}.$$

In this case, the virtual antenna mapping matrix is $$\Gamma = \frac{1}{2}\begin{bmatrix} 1 & 0 & 1 & 0 \\ 1 & 0 & j & 0 \\ 0 & 1 & 0 & 1 \\ 0 & 1 & 0 & j \end{bmatrix}[W_0 \ W_1]^{-1}.$$

During setting of the equivalent codebooks, the specified equivalent codebooks should ensure a maximum gain of two co-polarized antenna arrays as much as possible.

Step 204: The base station precodes a common pilot signal or a channel state information-reference signal (CSI-RS) by using the virtual antenna mapping matrix, and sends the precoded common pilot signal or CSI-RS to the N UEs.

After receiving the common pilot signal or the channel state information-reference signal, the UE performs channel measurement according to the common pilot signal or the channel state information-reference signal, selects, according to a channel measurement result and based on a performance indicator, a codebook that ensures optimal performance from the usable codebooks, obtains a PMI of the codebook, and obtains a CQI of a first codeword and a CQI of a second codeword according to the channel measurement result.

Figures 3, 4:
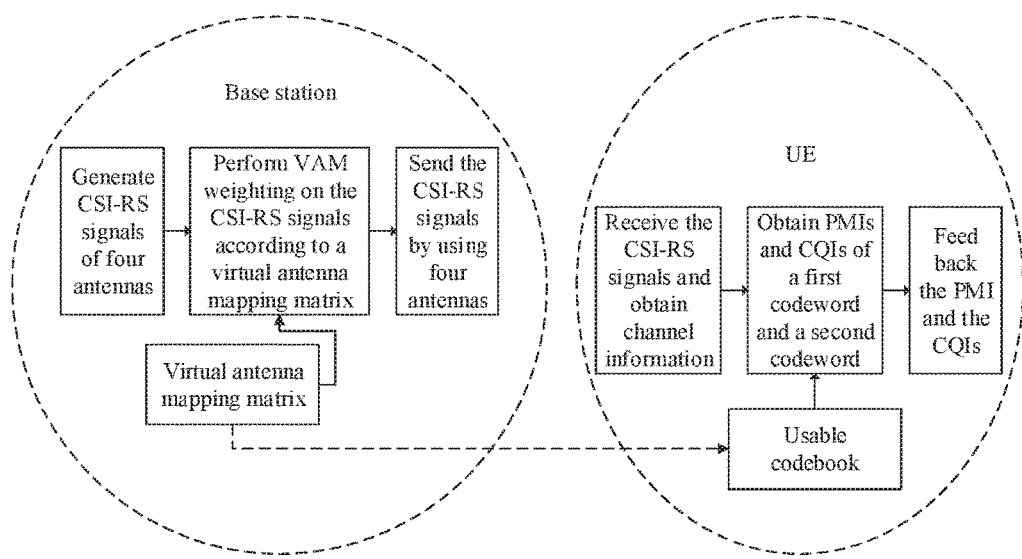
FIG. 3 is a schematic flowchart of PMI/CQI measurement according to an embodiment of the present invention.
FIG. 4 is a schematic diagram of switching between virtual antenna mapping matrices in different time segments.

FIG. 3 is a schematic flowchart of PMI/CQI measurement according to an embodiment of the present invention. As shown in FIG. 3, it is assumed that a base station has a total of four antennas, and that a quantity of usable codebooks is limited to 2. The base station first generates CSI-RS signals of the four antennas, then performs VAM weighting on the CSI-RS signals according to the virtual antenna mapping matrix, and obtains equivalent codebooks of the usable codebooks by means of VAM weighting. The virtual antenna mapping matrix is generated by the base station according to the two usable codebooks. The base station also informs a UE of PMIs of the usable codebooks. Finally, the base station sends the CSI-RS signals by using the four antennas. During transmission, the base station precodes the CSI-RSs by using the equivalent codebook. After receiving the CSI-RS signals, the UE obtains channel information. The channel information includes a CQI of a first codeword and a CQI of a second codeword. Then, the UE selects a codebook from the usable codebooks according to the channel information, and feeds back a PMI of the selected codebook, the CQI of the first codeword, and the CQI of the second codeword to the base station.

It should be noted that, when the UE performs channel measurement according to the channel state information-reference signal, the base station may use different virtual antenna mapping matrices in different time segments, and obtain different equivalent codebooks according to the different virtual antenna mapping matrices.

FIG. 4 is a schematic diagram of switching between virtual antenna mapping matrices in different time segments. As shown in FIG. 4, UEs have four usable codebooks: $W_0$, $W_1$, $W_2$, and $W_3$; PMIs of the four usable codebooks are $PMI_6$, $PMI_7$, $PMI_{10}$, and $PMI_{11}$; a base station has a total of four virtual antenna mapping matrices: $\Gamma_0$, $\Gamma_1$, $\Gamma_2$, and $\Gamma_3$; the base station uses $\Gamma_0$ from $\Delta+0$ ms to $\Delta+5$ ms, uses $\Gamma_1$ from $\Delta+5$ ms to $\Delta+10$ ms, uses $\Gamma_2$ from $\Delta+10$ ms to $\Delta+15$ ms, uses $\Gamma_3$ from $\Delta+15$ ms to $\Delta+20$ ms, and repeats this cyclically. The following relationships hold between the usable codebooks and the virtual antenna mapping matrices:

$$\Gamma_0 W_0 = \frac{1}{2}\begin{bmatrix} 1 & 0 \\ 1 & 0 \\ 0 & 1 \\ 0 & 1 \end{bmatrix}, \mathrm{rank}(\Gamma_0 W_1) < 2,$$

$$\mathrm{rank}(\Gamma_0 W_2) < 2, \text{ and } \mathrm{rank}(\Gamma_0 W_3) < 2;$$

$$\Gamma_1 W_1 = \frac{1}{2}\begin{bmatrix} 1 & 0 \\ -1 & 0 \\ 0 & 1 \\ 0 & -1 \end{bmatrix}, \mathrm{rank}(\Gamma_1 W_0) < 2,$$

$$\mathrm{rank}(\Gamma_1 W_2) < 2, \text{ and } \mathrm{rank}(\Gamma_1 W_3) < 2;$$

$$\Gamma_2 W_2 = \frac{1}{2}\begin{bmatrix} 1 & 0 \\ j & 0 \\ 0 & 1 \\ 0 & j \end{bmatrix}, \mathrm{rank}(\Gamma_2 W_0) < 2,$$

$$\mathrm{rank}(\Gamma_2 W_1) < 2, \text{ and } \mathrm{rank}(\Gamma_2 W_3) < 2; \text{ and}$$

$$\Gamma_3 W_3 = \frac{1}{2}\begin{bmatrix} 1 & 0 \\ -j & 0 \\ 0 & 1 \\ 0 & -j \end{bmatrix}, \mathrm{rank}(\Gamma_3 W_0) < 2,$$

$$\mathrm{rank}(\Gamma_3 W_1) < 2, \text{ and } \mathrm{rank}(\Gamma_3 W_2) < 2.$$

Within a minimum period of 20 ms, the base station can receive four groups of PMIs and CQIs fed back by each UE. During subsequent user pairing, the base station performs grouping according to the PMIs. Therefore, each pairing group includes all the UEs, and a probability of successful UE pairing in each pairing group is very high. For example, there are a total of four UEs: UE 1, UE 2, UE 3, and UE 4. Within 20 ms, each UE feeds back the four PMIs: $PMI_6$, $PMI_7$, $PMI_{10}$, and $PMI_{11}$. In this case, when grouping is performed according to the PMIs, a pairing group corresponding to $PMI_6$ includes the four UEs, and pairing groups corresponding to $PMI_7$, $PMI_{10}$, and $PMI_{11}$ each include the four UEs.

Step 205: The base station receives PMIs, and CQIs of first codewords and second codewords, where the PMIs and the CQIs are fed back by the N UEs.

Step 206: The base station divides the N UEs into M pairing groups according to the PMIs fed back by the N UEs, where PMIs of all UEs in each pairing group are the same.

Step 207: For each pairing group, the base station computes a scheduling priority of a first codeword of each UE in the pairing group according to CQIs of first codewords of all UEs in the pairing group, and computes a scheduling priority of a second codeword of each UE in the pairing group according to CQIs of second codewords of all the UEs in the pairing group.

Step 208: The base station determines a user pairing combination of the pairing group according to scheduling priorities of the first codewords of all the UEs in the pairing group and scheduling priorities of the second codewords of all the UEs in the pairing group, where the user pairing combination includes two UEs.

Step 209: The base station determines an optimal user pairing combination according to scheduling priorities of first codewords of UEs in M user pairing combinations of the M pairing groups and scheduling priorities of second codewords of the UEs in the M user pairing combinations of the M pairing groups.

Step 210: The base station sends scheduling control information to each UE in the optimal user pairing combination.

The scheduling control information for each UE includes a scheduling mode and an MCS. The scheduling mode for each UE is dual-stream scheduling, and the MCS for each UE includes an MCS for a first codeword and an MCS for a second codeword.

For a specific implementation manner of step 205 to step 210, refer to related descriptions in the first embodiment. Details are not repeated herein.

Step 211: When scheduling two UEs in the optimal user pairing combination simultaneously, the base station precodes, by using the equivalent codebook, data to be sent to the two UEs in the optimal user pairing combination, and sends a precoded signal.

In this embodiment, a base station limits a quantity of codebooks by determining a usable codebook for N UEs in a codebook set. Because the quantity of codebooks is limited, even if there is a relatively small quantity of UEs, there is a relatively large quantity of UEs in each pairing group. This increases a probability of successful pairing.

Figure 5:
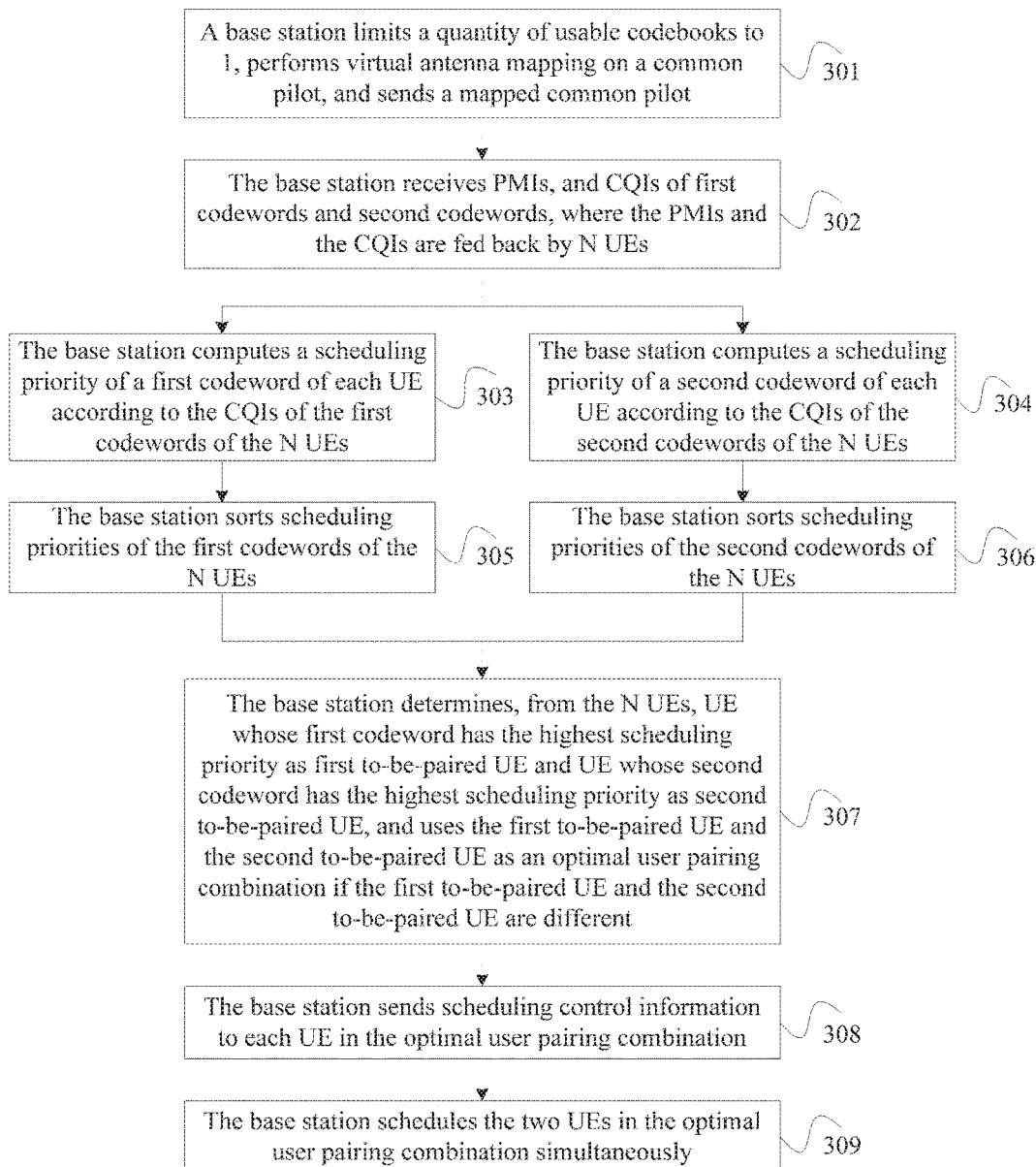
FIG. 5 is a flowchart of a method for multi-user scheduling in a MIMO system according to a third embodiment of the present invention.

A third embodiment of the present invention is described by using an example in which a base station has two transmit antennas. In addition, in this embodiment, a quantity of usable codebooks for UEs is limited to 1. FIG. 5 is a flowchart of a method for multi-user scheduling in a MIMO system according to the third embodiment of the present invention. The method provided in this embodiment may include the following steps.

Step 301: A base station limits a quantity of usable codebooks to 1, performs virtual antenna mapping on a common pilot, and sends a mapped common pilot.

For a specific implementation manner of this step, refer to descriptions about step 201 to step 205 in the second embodiment. Details are not repeated herein.

Step 302: The base station receives PMIs, and CQIs of first codewords and second codewords, where the PMIs and the CQIs are fed back by N UEs.

In this embodiment, because the base station limits the quantity of usable codebooks to 1, all the PMIs fed back by the N UEs are the same. Therefore, the base station does not need to perform division into pairing groups according to the PMIs.

Step 303: The base station computes a scheduling priority of a first codeword of each UE according to the CQIs of the first codewords of the N UEs.

Step 304: The base station computes a scheduling priority of a second codeword of each UE according to the CQIs of the second codewords of the N UEs.

Step 305: The base station sorts scheduling priorities of the first codewords of the N UEs.

Step 305 is performed after step 303 is performed.

Step 306: The base station sorts scheduling priorities of the second codewords of the N UEs.

Step 306 is performed after step 304 is performed.

Step 307: The base station determines a UE whose first codeword has the highest scheduling priority in the N UEs as a first to-be-paired UE and a UE whose second codeword has the highest scheduling priority as a second to-be-paired UE, and uses the first to-be-paired UE and the second to-be-paired UE as an optimal user pairing combination if the first to-be-paired UE and the second to-be-paired UE are different.

Step 307 is performed after step 305 and step 306 are performed.

Step 308: The base station sends scheduling control information to each UE in the optimal user pairing combination.

Step 309: The base station schedules the two UEs in the optimal user pairing combination simultaneously.

It should be noted that, in this embodiment, step 303 and step 304 are performed in no particular order and may be performed simultaneously; step 305 and step 306 are also performed in no particular order and may also be performed simultaneously. For a specific implementation manner of step 303 to step 309, refer to related descriptions in the first embodiment, and details are not repeated herein.

Figure 6:
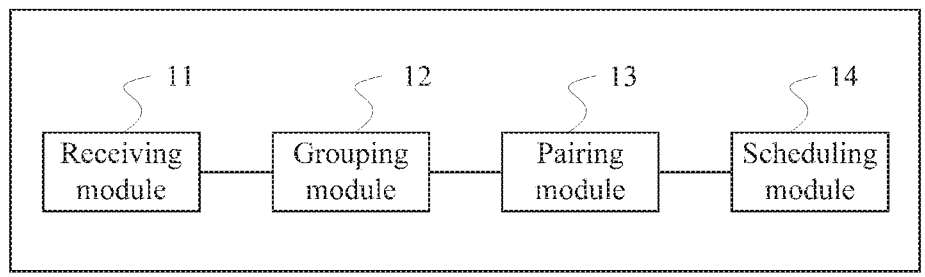
FIG. 6 is a schematic structural diagram of a base station according to a fourth embodiment of the present invention.

FIG. 6 is a schematic structural diagram of a base station according to a fourth embodiment of the present invention. As shown in FIG. 6, the base station provided in this embodiment includes a receiving module 11, a grouping module 12, a pairing module 13, and a scheduling module 14.

The receiving module 11 is configured to receive precoding matrix indicators PMIs, and channel quality indicators CQIs of first codewords and second codewords, where the PMIs and the CQIs are fed back by N user equipments UEs, and N is a positive integer greater than or equal to 1.

The grouping module 12 is configured to divide the N UEs into M pairing groups according to the PMIs fed back by the N UEs, where PMIs of all UEs in each pairing group are the same, and M is a positive integer greater than or equal to 1.

The pairing module 13 is configured to: for each pairing group, compute a scheduling priority of a first codeword of each UE in the pairing group according to CQIs of first codewords of all UEs in the pairing group, and compute a scheduling priority of a second codeword of each UE in the pairing group according to CQIs of second codewords of all the UEs in the pairing group.

The pairing module 13 is further configured to determine a user pairing combination of the pairing group according to scheduling priorities of the first codewords of all the UEs in the pairing group and scheduling priorities of the second codewords of all the UEs in the pairing group, where the user pairing combination includes two UEs.

The pairing module 13 is further configured to determine an optimal user pairing combination according to scheduling priorities of first codewords of UEs in M user pairing combinations of the M pairing groups and scheduling priorities of second codewords of the UEs in the M user pairing combinations of the M pairing groups, where two UEs in the optimal user pairing combination are different.

The scheduling module 14 is configured to schedule the two UEs in the optimal user pairing combination simultaneously.

Optionally, the determining, by the pairing module 13, a user pairing combination of the pairing group according to scheduling priorities of the first codewords of all the UEs in the pairing group and scheduling priorities of the second codewords of all the UEs in the pairing group is specifically:

comparing the scheduling priorities of the first codewords of all the UEs in the pairing group and the scheduling priorities of the second codewords of all the UEs in the pairing group, and determining a UE whose first codeword has the highest scheduling priority in the pairing group and a UE whose second codeword has the highest scheduling priority in the pairing group, where the UE whose first codeword has the highest scheduling priority is a first to-be-paired UE and the UE whose second codeword has the highest scheduling priority is a second to-be-paired UE; and using the first to-be-paired UE and the second to-be-paired UE as the user pairing combination of the pairing group.

Optionally, the determining, by the pairing module, an optimal user pairing combination according to scheduling priorities of first codewords of UEs in M user pairing combinations of the M pairing groups and scheduling priorities of second codewords of the UEs in the M user pairing combinations of the M pairing groups is specifically:

for each user pairing combination, obtaining a scheduling priority of the user pairing combination by adding a scheduling priority of a first codeword of the first to-be-paired UE in the user pairing combination and a scheduling priority of a second codeword of the second to-be-paired UE in the user pairing combination; and comparing scheduling priorities of the M user pairing combinations, and selecting, from the M user pairing combinations, a user pairing combination whose scheduling priority is the highest as the optimal user pairing combination.

The base station provided in this embodiment may be configured to execute the method in the first embodiment. Specific implementation manners and technical effects thereof are similar to those of the method in the first embodiment, and details are not repeated herein.

Figure 7:
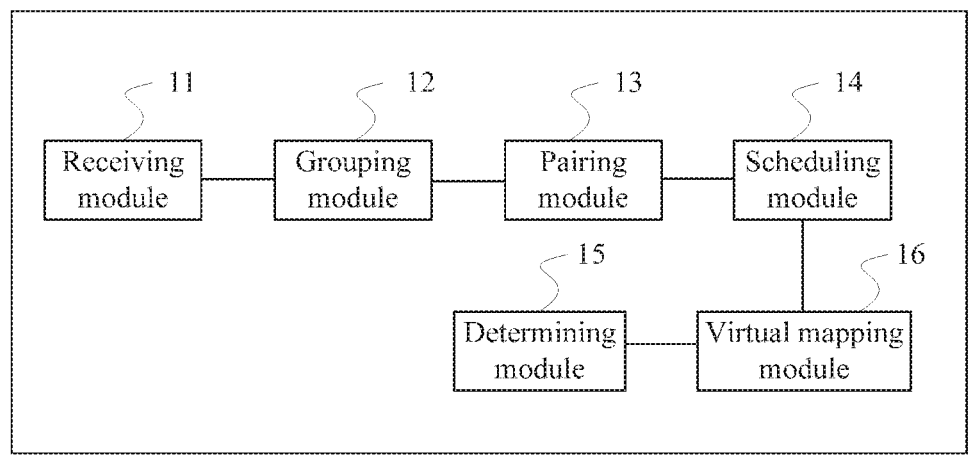
FIG. 7 is a schematic structural diagram of a base station according to a fifth embodiment of the present invention.

FIG. 7 is a schematic structural diagram of a base station according to a fifth embodiment of the present invention. As shown in FIG. 7, based on the structure of the base station shown in FIG. 6, the base station provided in this embodiment further includes a determining module 15 and a virtual mapping module 16.

The determining module 15 is configured to determine at least one usable codebook for the N UEs in a codebook set, and send a PMI of the at least one usable codebook to the N UEs, so that when feeding back the PMIs to the base station, the N UEs select the PMIs to be fed back to the base station from the PMI of the at least one usable codebook.

The virtual mapping module 16 is configured to determine a virtual antenna mapping matrix according to the at least one usable codebook and a preset equivalent codebook.

The virtual mapping module 16 is further configured to precode a common pilot signal or a channel state information-reference signal by using the virtual antenna mapping matrix, and send the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords.

Correspondingly, the scheduling module 14 is specifically configured to: when scheduling the UEs in the optimal user pairing combination simultaneously, precode, by using the equivalent codebook, data to be sent to the UEs in the optimal user pairing combination.

Optionally, the base station in this embodiment may further include a sending module, configured to send scheduling control information to each UE in the optimal user pairing combination, where the scheduling control information for each UE includes a scheduling mode and a modulation and coding scheme, the scheduling mode for each UE is dual-stream scheduling, the modulation and coding scheme for each UE includes a modulation and coding scheme for a first codeword and a modulation and coding scheme for a second codeword.

The base station provided in this embodiment may be configured to execute the methods in the second embodiment and the third embodiment. Specific implementation manners and technical effects thereof are similar to those of the methods in the second embodiment and the third embodiment, and details are not repeated herein.

Figure 8:
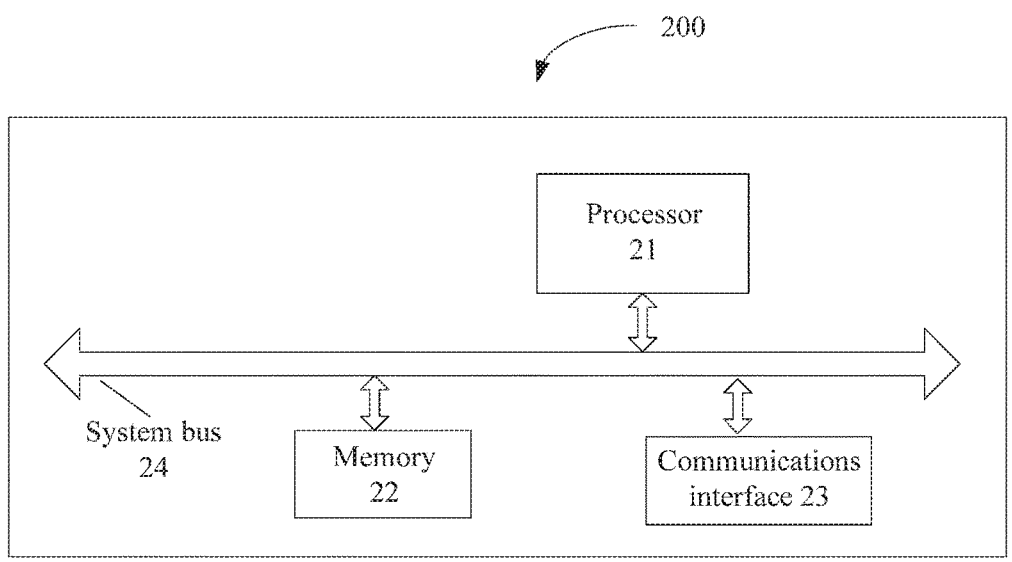
FIG. 8 is a schematic structural diagram of a base station according to a sixth embodiment of the present invention.

FIG. 8 is a schematic structural diagram of a base station according to a sixth embodiment of the present invention. As shown in FIG. 8, the base station 200 provided in this embodiment includes a processor 21, a memory 22, a communications interface 23, and a system bus 24. The memory 22 and the communications interface 23 connect to and communicate with the processor 21 by using the system bus 24. The memory 22 is configured to store a computer-executable instruction. The communications interface 23 is configured to communicate with another device. The processor 21 is configured to run the computer-executable instruction to execute the following method:

receiving PMIs, and CQIs of first codewords and second codewords, where the PMIs and the CQIs are fed back by N user equipments UEs, and N is a positive integer greater than or equal to 1;

dividing the N UEs into M pairing groups according to the PMIs fed back by the N UEs, where PMIs of all UEs in each pairing group are the same, and M is a positive integer greater than or equal to 1;

for each pairing group, computing a scheduling priority of a first codeword of each UE in the pairing group according to CQIs of first codewords of all UEs in the pairing group, and computing a scheduling priority of a second codeword of each UE in the pairing group according to CQIs of second codewords of all the UEs in the pairing group;

determining a user pairing combination of the pairing group according to scheduling priorities of the first codewords of all the UEs in the pairing group and scheduling priorities of the second codewords of all the UEs in the pairing group, where the user pairing combination includes two UEs;

determining an optimal user pairing combination according to scheduling priorities of first codewords of UEs in M user pairing combinations of the M pairing groups and scheduling priorities of second codewords of the UEs in the M user pairing combinations of the M pairing groups, where two UEs in the optimal user pairing combination are different; and scheduling the two UEs in the optimal user pairing combination simultaneously.

Optionally, the determining, by the processor 21, a user pairing combination of the pairing group according to scheduling priorities of the first codewords of all the UEs in the pairing group and scheduling priorities of the second codewords of all the UEs in the pairing group is specifically: comparing the scheduling priorities of the first codewords of all the UEs in the pairing group and the scheduling priorities of the second codewords of all the UEs in the pairing group; determining a UE whose first codeword has the highest scheduling priority in the pairing group and a UE whose second codeword has the highest scheduling priority in the pairing group, where the UE whose first codeword has the highest scheduling priority is a first to-be-paired UE and the UE whose second codeword has the highest scheduling priority is a second to-be-paired UE; and using the first to-be-paired UE and the second to-be-paired UE as the user pairing combination of the pairing group.

Optionally, the determining, by the processor 21, an optimal user pairing combination according to scheduling priorities of first codewords of UEs in M user pairing combinations of the M pairing groups and scheduling priorities of second codewords of the UEs in the M user pairing combinations of the M pairing groups is specifically: for each user pairing combination, obtaining, by the base station, a scheduling priority of the user pairing combination by adding a scheduling priority of a first codeword of the first to-be-paired UE in the user pairing combination and a scheduling priority of a second codeword of the second to-be-paired UE in the user pairing combination; comparing scheduling priorities of the M user pairing combinations; and selecting, from the M user pairing combinations, a user pairing combination whose scheduling priority is the highest as the optimal user pairing combination.

Optionally, before receiving the PMIs, and the CQIs of the first codewords and the second codewords, where the PMIs and the CQIs are fed back by the N UEs, the processor 21 is further configured to: determine at least one usable codebook for the N UEs in a codebook set and send a PMI of the at least one usable codebook to the N UEs, so that when feeding back the PMIs to the base station, the N UEs select the PMIs to be fed back to the base station from the PMI of the at least one usable codebook; determine a virtual antenna mapping matrix according to the at least one usable codebook and a preset equivalent codebook; and precode a common pilot signal or a channel state information-reference signal by using the virtual antenna mapping matrix, and send the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords. Correspondingly, the scheduling, by the processor 21, the UEs in the optimal user pairing combination simultaneously is specifically: when scheduling the UEs in the optimal user pairing combination simultaneously, precoding, by the processor 21 by using the equivalent codebook, data to be sent to the UEs in the optimal user pairing combination.

Optionally, after determining the optimal user pairing combination according to the scheduling priorities of the first codewords of the UEs in the M user pairing combinations of the M pairing groups and the scheduling priorities of the second codewords of the UEs in the M user pairing combinations of the M pairing groups, the processor 21 is further configured to send scheduling control information to each UE in the optimal user pairing combination, where the scheduling control information for each UE includes a scheduling mode and a modulation and coding scheme, the scheduling mode for each UE is dual-stream scheduling, and the modulation and coding scheme for each UE includes a modulation and coding scheme for a first codeword and a modulation and coding scheme for a second codeword.

The base station provided in this embodiment may be configured to execute the methods in the first embodiment to the third embodiment. Specific implementation manners and technical effects thereof are similar to those of the methods in the first embodiment to the third embodiment, and details are not repeated herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The storage medium includes any medium that can store program code, such as a ROM, a RAM, a magnetic disk, or an optical disc.

Finally, it should be noted that the foregoing embodiments are merely intended to describe the technical solutions of the embodiments of the present invention, but are not intended to limit the embodiments of the present invention. Although the embodiments of the present invention are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for multi-user scheduling in a MIMO system, the method comprising:
   receiving, by a base station, precoding matrix indicators (PMIs), and channel quality indicators (CQIs) of first codewords and second codewords, wherein the PMIs and the CQIs are fed back by N user equipments (UEs), and wherein N is a positive integer greater than or equal to 1;
   dividing, by the base station, the N UEs into M pairing groups according to the PMIs fed back by the N UEs, wherein the PMIs of all UEs in the same pairing group are the same, and M is a positive integer greater than or equal to 1;
   for each pairing group, computing, by the base station, a scheduling priority of a first codeword of each UE in each pairing group according to the CQIs of the first codewords of all UEs in each pairing group, and computing a scheduling priority of a second codeword of each UE in each pairing group according to the CQIs of the second codewords of all the UEs in the pairing group;
   determining, by the base station, a user pairing combination of each pairing group according to scheduling priorities of the first codewords of all the UEs in each pairing group and scheduling priorities of the second codewords of all the UEs in each pairing group, wherein the user pairing combination comprises two UEs;
   determining, by the base station, an optimal user pairing combination according to the scheduling priorities of the first codewords of UEs in M user pairing combinations of the M pairing groups and the scheduling priorities of the second codewords of the UEs in the M user pairing combinations of the M pairing groups, wherein two UEs in the optimal user pairing combination are different; and
   scheduling, by the base station, the two UEs in the optimal user pairing combination simultaneously.

2. The method according to claim 1, wherein the user pairing combination of each pairing group comprises a first to-be-paired UE and a second to-be-paired UE, and the first to-be-paired UE is a UE whose first codeword has the highest scheduling priority in each pairing group, the second to-be-paired UE is a UE whose second codeword has the highest scheduling priority in each pairing group.

3. The method according to claim 2, wherein the optimal user pairing combination is a user pairing combination whose scheduling priority is the highest in the M user pairing combinations, and wherein the scheduling priority of the user pairing combination is a sum of a scheduling priority of a first codeword of a first to-be-paired UE in the user pairing combination and a scheduling priority of a second codeword of a second to-be-paired UE in the user pairing combination.

4. The method according to claim 1, further comprising, before receiving, by a base station, the PMIs and the CQIs of the first codewords and the second codewords, wherein the PMIs and the CQIs are fed back by N UEs:
   determining, by the base station, at least one usable codebook for the N UEs in a codebook set, and sending a PMI of the at least one usable codebook to the N UEs, so that when feeding back the PMIs to the base station, the N UEs select the PMIs to be fed back to the base station from the PMI of the at least one usable codebook;
   determining, by the base station, a virtual antenna mapping matrix according to the at least one usable codebook and a preset equivalent codebook; and
   precoding, by the base station, a common pilot signal or a channel state information-reference signal by using the virtual antenna mapping matrix, and sending the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords,
   wherein scheduling, by the base station, the UEs in the optimal user pairing combination simultaneously comprises, when scheduling the UEs in the optimal user pairing combination simultaneously, precoding, by the base station by using the equivalent codebook, data to be sent to the UEs in the optimal user pairing combination.

5. The method according to claim 1, further comprising, after determining, by the base station, the optimal user pairing combination according to the scheduling priorities of the first codewords of the UEs in the M user pairing combinations of the M pairing groups and the scheduling priorities of the second codewords of the UEs in the M user pairing combinations of the M pairing groups:
   sending, by the base station, scheduling control information to each UE in the optimal user pairing combination, wherein the scheduling control information for each UE comprises a scheduling mode and a modulation and coding scheme, the scheduling mode for each UE is dual-stream scheduling, and the modulation and coding scheme for each UE comprises a modulation and coding scheme for a first codeword and a modulation and coding scheme for a second codeword.

6. A base station comprising:
a processor, a memory, a communications interface, and a system bus, wherein the memory and the communications interface connect to and communicate with the processor by using the system bus,
wherein the memory is configured to store a computer-executable instruction, and
wherein the processor is configured to run the computer-executable instruction to execute a method for multi-user scheduling in a MIMO system, the method comprising:
receiving precoding matrix indicators (PMIs), and channel quality indicators (CQIs) of first codewords and second codewords, wherein the PMIs and the CQIs are fed back by N user equipments (UEs), and wherein N is a positive integer greater than or equal to 1;
dividing the N UEs into M pairing groups according to the PMIs fed back by the N UEs, wherein PMIs of all UEs in the same pairing group are the same, and M is a positive integer greater than or equal to 1;
for each pairing group, computing a scheduling priority of a first codeword of each UE in each pairing group according to the CQIs of the first codewords of all UEs in each pairing group, and computing a scheduling priority of a second codeword of each UE in each pairing group according to the CQIs of the second codewords of all the UEs in each pairing group;
determining a user pairing combination of each pairing group according to scheduling priorities of the first codewords of all the UEs in each pairing group and scheduling priorities of the second codewords of all the UEs in each pairing group, wherein the user pairing combination comprises two UEs;
determining an optimal user pairing combination according to the scheduling priorities of the first codewords of UEs in M user pairing combinations of the M pairing groups and scheduling the scheduling priorities of the second codewords of the UEs in the M user pairing combinations of the M pairing groups, wherein two UEs in the optimal user pairing combination are different; and
scheduling the two UEs in the optimal user pairing combination simultaneously.

7. The base station according to claim 6, wherein the use pairing combination of each pairing group comprises a first to-be-paired UE and a second to-be-paired UE, and the first to-be-paired UE is a UE whose first codeword has the highest scheduling priority in each pairing group, and the second to-be-paired UE is a UE whose second codeword has the highest scheduling priority in each pairing group.

8. The base station according to claim 6, wherein the optimal user pairing combination is a user pairing combination whose scheduling priority is the highest in the M user pairing combinations, and wherein the scheduling priority of the user pairing combination is a sum of a scheduling priority of a first codeword of a first to-be-paired UE in the user pairing combination and a scheduling priority of a second codeword of a second to-be-paired UE in the user pairing combination.

9. The base station according to claim 6, further comprising, before the receiving the PMIs and the CQIs of the first codewords and the second codewords, wherein the PMIs and the CQIs are fed back by N UEs:

determining at least one usable codebook for the N UEs in a codebook set, and sending a PMI of the at least one usable codebook to the N UEs, so that when feeding back the PMIs to the base station, the N UEs select the PMIs to be fed back to the base station from the PMI of the at least one usable codebook;
determining a virtual antenna mapping matrix according to the at least one usable codebook and a preset equivalent codebook; and
precoding a common pilot signal or a channel state information-reference signal by using the virtual antenna mapping matrix, and sending the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords,
wherein scheduling the UEs in the optimal user pairing combination simultaneously comprises, when scheduling the UEs in the optimal user pairing combination simultaneously, precoding by using the equivalent codebook, data to be sent to the UEs in the optimal user pairing combination.

10. The base station according to claim 6, further comprising, after determining the optimal user pairing combination according to scheduling priorities of the first codewords of the UEs in the M user pairing combinations of the M pairing groups and the scheduling priorities of the second codewords of the UEs in the M user pairing combinations of the M pairing groups:
sending scheduling control information to each UE in the optimal user pairing combination, wherein the scheduling control information for each UE comprises a scheduling mode and a modulation and coding scheme, the scheduling mode for each UE is dual-stream scheduling, and the modulation and coding scheme for each UE comprises a modulation and coding scheme for a first codeword and a modulation and coding scheme for a second codeword.

11. A computer program product comprising a non-transitory computer-readable medium storing computer executable instructions, the instructions comprising:
receiving precoding matrix indicators (PMIs), and channel quality indicators (CQIs) of first codewords and second codewords, wherein the PMIs and the CQIs are fed back by N user equipments (UEs), and wherein N is a positive integer greater than or equal to 1;
dividing the N UEs into M pairing groups according to the PMIs fed back by the N UEs, wherein PMIs of all UEs in the same pairing group are the same, and M is a positive integer greater than or equal to 1;
computing a scheduling priority of a first codeword of each UE in each pairing group according to the CQIs of the first codewords of all UEs in each pairing group, and computing a scheduling priority of a second codeword of each UE in each pairing group according to the CQIs of the second codewords of all the UEs in each pairing group;
determining a user pairing combination of each pairing group according to the scheduling priorities of the first codewords of all the UEs in each pairing group and the scheduling priorities of the second codewords of all the UEs in each pairing group, wherein the user pairing combination comprises two UEs;
determining an optimal user pairing combination according to scheduling priorities of first codewords of UEs in M user pairing combinations of the M pairing groups and scheduling priorities of second codewords of the UEs in the M user pairing combinations of the M pairing groups, wherein two UEs in the optimal user pairing combination are different; and instructions for scheduling the two UEs in the optimal user pairing combination simultaneously.

12. The computer program product according to claim 11, wherein the use pairing combination of each pairing group comprises a first to-be-paired UE and a second to-be-paired UE, and the first to-be-paired UE is a UE whose first codeword has the highest scheduling priority in each pairing group, the second to-be-paired UE is a UE whose second codeword has the highest scheduling priority in each pairing group.

13. The computer program product according to claim 11, wherein the optimal user pairing combination is a user pairing combination whose scheduling priority is the highest in the M user pairing combinations, and wherein the scheduling priority of the user pairing combination is a sum of a scheduling priority of a first codeword of a first to-be-paired UE in the user pairing combination and a scheduling priority of a second codeword of a second to-be-paired UE in the user pairing combination.

14. The computer program product according to claim 11, wherein the instructions further comprise:

determining at least one usable codebook for the N UEs in a codebook set, and sending a PMI of the at least one usable codebook to the N UEs, so that when feeding back the PMIs to a base station, the N UEs select the PMIs to be fed back to the base station from the PMI of the at least one usable codebook;

determining a virtual antenna mapping matrix according to the at least one usable codebook and a preset equivalent codebook; and precoding a common pilot signal or a channel state information-reference signal by using the virtual antenna mapping matrix, and sending the precoded common pilot signal or channel state information-reference signal to the N UEs, so that the N UEs perform channel measurement according to the common pilot signal or the channel state information-reference signal, to obtain the PMIs, and the CQIs of the first codewords and the second codewords, and wherein the instructions for scheduling the UEs in the optimal user pairing combination simultaneously comprises instructions for precoding by using the equivalent codebook, data to be sent to the UEs in the optimal user pairing combination when scheduling the UEs in the optimal user pairing combination simultaneously.

15. The computer program product according to claim 11, wherein the instructions further comprises instructions for sending scheduling control information to each UE in the optimal user pairing combination, wherein the scheduling control information for each UE comprises a scheduling mode and a modulation and coding scheme, the scheduling mode for each UE is dual-stream scheduling, and the modulation and coding scheme for each UE comprises a modulation and coding scheme for a first codeword and a modulation and coding scheme for a second codeword.

* * * * *